United States Patent Office 3,459,106
Patented Aug. 5, 1969

3,459,106
HIGHWAY MARKING COMPOSITIONS AND METHOD
Alfred R. Johnson, Reading, Mass., assignor to Arthur D. Little, Inc., Cambridge, Mass., a corporation of Massachusetts
No Drawing. Filed Nov. 12, 1965, Ser. No. 507,534
Int. Cl. E01f 9/04
U.S. Cl. 94—1.5
11 Claims

ABSTRACT OF THE DISCLOSURE

A novel method for marking highways and more particularly for marking asphalt highways with a paint which can be readily and permanently converted to a dark or black color thereby avoiding subsequent confusion by motorists. The paint contains as a film-forming binder material a resin which is thermally degradable in the presence of an inorganic catalyst which is incorporated in the paint.

---

When a highway is under construction or is being repaired it is customary to re-route the traffic temporarily around the section which is being constructed or repaired. Typically, this is done by routing the traffic through one-lane, one-direction sections or in the case of multilane highways, making one of the lanes available for traffic in a direction opposite to that for which it is normally used. In order to mark the highway for a temporary bypass or change in traffic pattern it is necessary to paint a colored stripe to indicate the boundary of the traffic lane which is to be used temporarily. After the temporary lane is no longer to be defined by the use of traffic paint in this manner, it is necessary to obliterate the marking so as not to mislead motorists into later believing that the once temporary line in fact defines the traffic lane. For example, it would be possible to mislead a motorist off the shoulder of a road or into the wrong side of a highway which was no longer available to him.

In putting down the temporary lane-marking lines it is customary to use conventional traffic paint which may typically be a pigmented alkyd resin paint. After this temporary marking is no longer required, it is usually covered up with an asphalt-sealing compound. However, it has been observed that where the temporary marking has been covered up in this manner, the asphalt tends to wear off rapidly, thus exposing the temporary unwanted lane-marking line. Since such road paint is designed for long wear it means that there is a strong possibility that the temporary marking will again show through and lead to a dangerous situation. It is not possible to remove this road paint with paint removers since these tend to dissolve the asphalt which is used to serve as a binder for the gravel particles in the road material. Likewise, it is not feasible to burn off the road paint since this also will destroy the asphalt.

Another approach to temporary road markings has been the use of a colored tape having a pressure-sensitive adhesive on one surface. The tape is then caused to adhere to the road as a line marking. However, since the tape must be able to resist wear caused by driving over it, it means that its adherence to the road must be very strong which in turn means that it is extremely difficult to remove. Finally, there is the possibility of sandblasting off the temporary markings, whether they are in the form of paint or tape, but this is an expensive process and it poses the problem of damaging the surface of the highway.

It would therefore be desirable to have available a paint which could be used to put down temporary markings in highways and which would be long-wearing and remain until such time as it was desired to obliterate it permanently. According to this invention, a method is provided for marking highways with a paint which has good wear qualities and which can subsequently be converted to a dark or black condition through heat to permanently obliterate the marking when used on asphalt roads and eliminate all possibility of its ever introducing confusion for the motorist.

It is therefore a primary object of this invention to provide a method for marking roads with temporary markings which can be subsequently and permanently altered so that the markings are no longer visible. It is another object of this invention to provide a method of the character described which can be used to mark roads with any desired color, particularly yellow or white. It is another primary object of this invention to provide a temporary road paint which is stable, exhibits good resistance to wear, abrasion and weather, has good adhesion to the road surface and is adaptable to the incorporation of small retroreflecting glass beads. It is yet a further object of this invention to provide a road paint of the character described which can be rapidly and permanently converted to a nonvisible state by the application of localized heating. Other objects of the invention will in part be obvious and will in part be apparent hereinafter.

The invention accordingly comprises the several steps and the relation of one or more of such steps with respect to each of the others, and the article possessing the features, properties, and the relation of elements which are exemplified in the following detailed disclosure, and the scope of the invention will be indicated in the claims.

The method of highway marking of this invention can be characterized by the step of depositing a marking on the highway, and particularly an asphalt-covered highway, in the form of a paint which under normal circumstances is stable and has good wear resistance. The paint is formed of an organic polymer which contains chlorine and bromine dissolved in a volatile solvent, or present in an aqueous emulsion, containing a thermal degradation catalyst for the polymer. When it is desired permanently to obliterate the marking, sufficient localized heat is applied to the marking to degrade the polymer to convert it to a permanently, essentially invisible state. The heating in effect blackens or discolors the polymer thus causing the marking to blend with the road surface to make it essentially invisible.

The highway marking paint of this invention is formed of the thermally degradable polymer and an inorganic metal salt in a finely-divided powdered form which preferably serves in the role of both thermal degradation catalyst and paint pigment. The paint may also contain small glass beads to make it retroreflective in accordance with known procedure, and a minor amount of a material such as finely-divided aluminum which serves to provide "hot spots" to accelerate the degradation of the polymer, a process which is autocatalytic.

The thermal degradation of organic polymers containing a linear chain to which is attached one or more chlorine or bromine atoms by the incorporation therein of certain inorganic metal salts is known (see for example, U.S. Patent 2,855,266). In their prior application these polymers, along with the thermal degradation catalyst, were used to form thin films on recording materials which could be marked by contacting them with a hot stylus to degrade the polymer locally and form a line thereon. In making the recording paper it was, of course, necessary to deposit on it a composition which could be thermally degraded at temperatures sufficiently low so that the paper substrate would in itself not be degraded or burned. It is also necessary to be able to control the degradation so that the line formed is sharp and relatively thin. Moreover, in coating substrates such as paper it is generally preferable to make up the coating composition in the form of a latex since the removal of the water medium can be extended over a period of time and the substrate can be passed through a suitable heating means such as an air oven, etc. Finally, in the use of the polymer film to coat recording material the film itself takes on a certain degree of "blush" which means that there is no necessity of using an inorganic degradation catalyst which can serve as a pigment as well. Thus, the marking of a road presents a different situation than that of making recording paper.

The polymer used to form the paint for road marking must be an organic polymeric material, which preferably contains a linear chain, to which is attached one or more chlorine or bromine atoms. Preferably, it is also one which is readily soluble in an inexpensive volatile organic solvent such as one of the ketones, toluene, benzene or mixtures of these. Lattices, although they may be used, are not preferred since they do not set up and dry as rapidly as is desired for road marking. Among the polymers which may be used are polyvinyl chloride, copolymers of vinyl chloride and vinyl acetate, polyvinylidene chloride and chlorinated rubber.

The inorganic catalyst may be a compound of magnesium, iron, cobalt, nickel, copper, zinc, arsenic, molybdenum silver, tin antimony and lead. The preferred inorganic catalysts are zinc oxide for a white paint and zinc chromate for a yellow paint. Since traffic-marking lines are normally either white or yellow. It will be desirable to use inorganic salts which are themselves one of these colors and which therefore provide the necessary pigment component in the paint without the need to add an additional pigment thereto. It is of course, within the scope of this invention to add pigments such as titanium dioxide, dyes, or extenders such as clay or acid clay attapulgite to the paint composition if these are necessary.

Although the prints can be applied as an aqueous emulsion, it will normally be desirable to make up the paints with a volatile organic solvent and spray or otherwise apply the paint onto the highway surface. Spraying lends itself well to present techniques for applying markings to highways. The solvent may be any of the lower alkyl ketones such as methyl ethyl ketone, or methyl isobutyl ketone or a suitable aromatic solvent such as benzene or toluene. It is, of course, also within the scope of this invention to use mixed organic solvents.

If the pH of the degraded material is relatively low, i.e., about 4 or less, the degradation reaction is somewhat more rapid, or conversely it can be carried out at somewhat lower temperatures. However, in highway markings the use of temperatures sufficiently high to bring about the thermal degradation essentially instantaneously is quite feasible and therefore catalysts which contribute to the acidity of the system are not generally required. However, if desired, small amounts of an acid-releasing agent such as dimethyl aniline hydrochloride may be added to the paint composition.

It is also within the scope of this invention to incorporate into the paint a quantity of small-diameter retroreflecting glass beads such as those normally used in traffic-marking paints. Typically, these beads will be sized within a range such that they will pass through a 30-mesh screen and be retained on a 70-mesh screen. They will normally have an index of refraction above about 1.5 and be used up to amounts of about 25% by weight of the liquid paint. In keeping with the usual practice, the beads may be added to the paint prior to its application to the highway surface, or they may be deposited on the wet paint after it has been applied to the highway.

It is also within the scope of this invention to add materials, up to a few percent by weight (e.g., 2%), such as fine paint-grade aluminum flakes (325-mesh or smaller) which form small heat sinks. The purpose of these is to concentrate the heat applied to the marking during the process of obliteration so that there might be within the paint localized hot spots which contribute to the rapidity with which the thermal degradation process takes place. Any glass beads incorporated in the paint may also serve in this capacity.

The polymer in the dry paint marking serves in the dual role of a marking film and a binder for the inorganic particulate material, for the additional pigment particles if they are added, for any glass beads and for any other particulate material which may be incorporated. The quantity of the polymer therefore depends, at least to some extent, upon the amount of particulate material which must be bonded to the road surface. It is, on the other hand, not desirable to incorporate too much polymeric material for it increases the cost and, if used as a solution, it may increase the viscosity of the paint above that which is readily applied to the road surface.

Because of the abrasion to which the paint is subjected by the automobile tires passing over it, it is preferable to restrict the amount of inorganic particulate matter which is added since the polymeric material must serve as a binder for it as well as for any glass beads which are incorporated in the paint. It is therefore preferable that the amount of polymer and of inorganic thermal degradation catalytic material be maintained within certain weight percentages. Based upon the total weight of a basic paint mixture consisting of polymer, inorganic catalyst and solvent, the amount of polymer should range between about 10 and 35% by weight and the amount of inorganic particulate thermal degradation catalyst should range between about 5 and 40% by weight. The remainder of the basic paint mixture should then be solvent, or water if an emulsion is used. The actual quantity of solvent used will be that which is necessary to give the desired fluid characteristics to the paint. Generally, it is preferable to use between about 65 and 80% solvent. It will, of course, normally be desirable to balance the quantity of solvent between the lowest quantity which can be used and that which is optimum for the means by which it is to be applied. Such a balance attains a compromise between ease of application and reduction in cost of the paint and in the drying time of the paint once it is applied to the highway.

If other particulate matter (e.g., glass beads, aluminum flakes, pigments or acid catalyst are included) then it will be preferable to use the polymer in the higher concentrations and the inorganic thermal degradation catalyst in the lower concentrations. However, there must be a sufficient quantity of this catalyst to at least trigger the thermal degradation of the polymer at the temperature used.

As indicated above, the paint may be applied by any known method such as by spraying, brushing, or extruding onto the highway surface.

In removing the highway marking it is, of course, necessary to apply localized heat to the marking. This may be done by a number of methods. For example, the marking may be contacted by the flame of a blowtorch. It may also be exposed to intense radiant energy from a suitable infrared heater. Another way of destroying the marking is to cover it with hot asphalt which is normally applied at 225° F. Although the temperature of the hot asphalt is somewhat less than that which would be attained by a blowtorch, for example, the asphalt cover provides sufficient time for the degradation to take place prior to any opportunity that might arise to expose the temporary line by wearing off the asphalt coating. In such cases an acid catalyst may be added to lower the degradation temperature. In general, temperatures of at least 275° F. are required to bring about rapid degradation of the polymeric material in the marking and bring about permanent obliteration of the markings; while temperatures of the order of 350 to 475° F. are required to effect substantially instantaneous degradation. It is therefore apparent that ambient temperatures, even those which prevail on highways in the desert are insufficient to degrade the paint and remove the markings.

The invention is further described in the following examples which are meant to be illustrative and not limiting.

Example 1

A yellow paint was formulated having the following composition:

| | Percent by weight |
|---|---|
| Copolymer of vinyl chloride/vinyl acetate (85/15) | 15.8 |
| Zinc chromate | 10.6 |
| Methyl isobutyl ketone | 32.1 |
| Methyl ethyl ketone | 32.1 |
| Toluene | 9.4 |

The polymer was divided into equal portions and one portion was dissolved in the methyl isobutyl ketone and the other portion in the methyl ethyl ketone, thus making 20% solutions. The zinc chromate was wetted with some of the solutions and ball milled to a fineness of grind of 7 to form a paste which was then thoroughly and uniformly mixed with the remaining portions of the polymer solutions. Finally, the toluene was stirred in to form a paint of a consistency which could be readily sprayed by a commercially available paint sprayer. The paint thus formed was sprayed on asphalt strips and dried very rapidly to form a bright yellow marking. Before drying glass beads could be deposited on it and they were firmly bonded to the film formed. When contacted with heat from a blowtorch, the marking turned black, blended with the asphalt and became permanently obliterated.

Example 2

The zinc chromate of Example 1 was replaced by zinc oxide and the copolymer of vinyl chloride/vinyl acetate was replaced by commercially available vinyl chloride. The resulting paint was white. It turned black when exposed to the intense heat of an infrared heater. In like manner, vinylidene chlorine and chlorinated rubber were used as the polymeric material. The white paint formed of these materials were readily blackened by the application of intense heat.

Example 3

A white paint was formulated having the following composition:

| | Percent by weight |
|---|---|
| Copolymer of vinyl chloride/vinyl acetate (85/15) | 13.3 |
| Zinc oxide | 17.0 |
| Methyl isobutyl ketone | 48.6 |
| Methyl ethyl ketone | 21.2 |

The polymer was dissolved in the mixed solvents and the zinc oxide was ball milled, to the fineness attained in Example 1, with some of the solution to form a paste before being stirred into the remaining portion of the solution. The paint formed was white and it could be sprayed onto a surface. It turned black when exposed to the heat of a blowtorch.

Example 4

A white paint was made in the same manner as Example 1 using the following formulation:

| | Percent by weight |
|---|---|
| Copolymer of vinyl chloride/vinyl acetate (85/15) | 18.8 |
| Zinc oxide | 6.2 |
| Methyl isobutyl ketone | } 75.3 |
| Methyl ethyl ketone | |

This paint was sprayed on a surface and it turned black when exposed to intense heat.

To 100 parts by weight of this basic paint formulation was added 22 parts by weight of glass beads sized between −30 and +70-mesh having an index of refraction of 1.5. When sprayed on a surface, this paint was retroreflecting. The application of intense heat obliterated it from the surface.

To 100 parts by weight of the basic paint formulation of this example was added one part by weight of paint grade aluminum flakes (through 325-mesh). When a surface marking of this paint was heated, the thermal degradation which obliterated it was somewhat faster than in the case of the basic formulation.

Example 5

A white paint was made up in the form of an emulsion by ball milling 11 parts by weight of zinc oxide in 32 parts by weight (50% solids) of a polyvinyl chloride latex. The latex was a commercially available material and contains a plasticizer and a wetting agent. The paint thus prepared could be used to mark lines on asphalt, with or without the addition of glass beads, but it did not dry as rapidly as the paints of Examples 1–4. Lines made with the paint of this example turned black with the application of heat.

The reaction which converts the paint of this invention to a substantially invisible state is irreversible and hence any marking once removed from a highway can in no way ever appear again to present a dangerous misleading situation. Obliteration of the marking is inexpensive, substantially instantaneous and can be accomplished without damage to the highway surface. Moreover, the thermal degradation of the polymeric material may be such that the film actually breaks up into flakes which are abraded or blown off the highway surface. This in turn means that the highway marking of this invention can be used on light-colored surfaces, e.g., concrete.

It will thus be seen that the objects set forth above, among those made apparent from the preceding description, are efficiently attained and, since certain changes may be made in carrying out the above method and in the article set forth without departing from the scope of the invention, it is intended that all matter contained in the above description shall be intepreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A method of temporarily marking a highway, characterized by the step of depositing a marking on a highway in the form of a paint comprising an organic polymeric material, thermally undegradable at a temperature reached by the surface of a highway and characterized by including chlorine or bromine in its structure, dissolved in a volatile organic solvent and containing a thermal degradation catalyst for said polymer in finely divided particulate form, whereby said marking can be permanently obliterated by the application of sufficient heat thereto to degrade said polymer and convert said marking to a permanently, essentially invisible state.

2. A method in accordance with claim 1 wherein said polymeric material is a copolymer of vinyl chloride and vinyl acetate or polyvinyl chloride.

3. A method in accordance with claim 1 wherein said thermal degradation catalyst is zinc oxide.

4. A method in accordance with claim 1 wherein said thermal degradation catalyst is zinc chromate.

5. A method in accordance with claim 1 further characterized in that said paint contains glass beads whereby said marking is retroreflective.

6. A highway, the surface of which has temporary markings for the benefit of motorists, characterized in that said markings are a film adhered to said highway surface and formed of a polymeric material thermally degradable at a temperature above that reached by said highway surface and including chlorine or bromine in its structure, said film containing bonded thereto a finely divided inorganic particulate matter which is a catalyst for the thermal degradation of said polymeric material, whereby said marking can be permanently obliterated by the application of localized heat thereto.

7. A highway marked in accordance with claim 6 wherein said polymeric material is a copolymer of vinyl chloride and vinyl acetate.

8. A highway marked in accordance with claim 6 wherein said polymeric material is vinyl chloride.

9. A highway marked in accordance with claim 6 wherein said inorganic matter is zinc oxide.

10. A highway marked in accordance with claim 6 wherein said inorganic matter is zinc chromate.

11. A highway marked in accordance with claim 6 wherein said film also contains retroreflective glass beads bonded thereto and uniformly distributed therethrough.

References Cited

UNITED STATES PATENTS 2,855,266  10/1958  James.
2,879,171  3/1959  Kullenberg.

MURRAY TILLMAN, Primary Examiner

W. J. BRIGGS, Sr., Assistant Examiner

U.S. Cl. X.R.

94—22; 260—29, 32, 33